United States Patent
Champion

(10) Patent No.: US 7,341,509 B2
(45) Date of Patent: Mar. 11, 2008

(54) FOOT IMPRESSION RECORDING APPARATUS

(76) Inventor: Robert Bryan Champion, 558 El Dorado Blvd., #155, Webster, TX (US) 77598

( * ) Notice: Subject to any disclaimer, the term of this patent is extended or adjusted under 35 U.S.C. 154(b) by 283 days.

(21) Appl. No.: 11/061,998

(22) Filed: Feb. 17, 2005

(65) Prior Publication Data
US 2006/0183520 A1 Aug. 17, 2006

(51) Int. Cl.
*B41L 1/00* (2006.01)
*B41L 1/26* (2006.01)
*A01M 31/00* (2006.01)
*G01B 1/00* (2006.01)

(52) U.S. Cl. ................... 462/1; 33/511; 43/1

(58) Field of Classification Search ............ 462/1, 462/84; 33/511, 514.2, 515, 561.1, 561.2; 43/1; 283/68, 69
See application file for complete search history.

(56) References Cited

U.S. PATENT DOCUMENTS

| | | | | |
|---|---|---|---|---|
| 1,914,049 A | * | 6/1933 | Smith | 264/223 |
| 2,591,565 A | * | 4/1952 | Linnard | 264/259 |
| 2,611,170 A | * | 9/1952 | Theis | 249/55 |
| 2,688,760 A | * | 9/1954 | Forte | 12/146 M |
| 3,320,347 A | * | 5/1967 | Greenawalt | 264/223 |
| 3,825,017 A | * | 7/1974 | Scrima | 36/181 |
| 4,696,068 A | * | 9/1987 | Kenner | 4/606 |
| 5,263,742 A | * | 11/1993 | Koch | 283/78 |
| 5,445,863 A | * | 8/1995 | Slagle et al. | 428/156 |
| 6,293,026 B1 | * | 9/2001 | Lee et al. | 33/512 |
| 6,625,897 B2 | * | 9/2003 | Tadin | 33/515 |
| 2002/0144363 A1 | * | 10/2002 | Royall | 12/142 N |
| 2005/0183219 A1 | * | 8/2005 | Saladino | 12/146 B |

* cited by examiner

*Primary Examiner*—Monica Carter
*Assistant Examiner*—Pradeep C Battula
(74) *Attorney, Agent, or Firm*—Invention Protection Associates, LLC

(57) ABSTRACT

An apparatus for recording foot, hoof and paw impressions is disclosed. An impression member is atop a foundation member, both of which are concealed by a removable protective cover. The impression member records the shape of a foot, hoof or paw which steps upon the apparatus, while the cover resists water and camouflages the apparatus.

7 Claims, 3 Drawing Sheets

FOOT IMPRESSION RECORDING APPARATUS

BACKGROUND OF THE INVENTION

1. Field of the Invention

The present invention generally relates to an apparatus used for recording foot, hoof and paw impressions, and it specifically relates to an apparatus used to obtain those impressions for the purpose of conveying, to a hunter or land proprietor, information regarding the presence, species, size and travel patterns of an animal or person visiting an area in which the apparatus is deployed.

2. Description of Prior Art

In the sport of hunting, attraction devices such as decoys and animal calls have long been used to lure animals to within the vicinity of stationed hunters and, thereby, increase hunters' probabilities of killing prey. Of course, a hunter can enhance his likelihood of hunting success by stationing himself within part of a hunting area that his desired prey is known to frequent. So, in addition to using attraction devices, hunters often will employ other means and techniques for gathering hunting intelligence regarding things such as particular areas that prey has visited in the past; particular timeframes during which they tend to visit those areas; and size, maturity and sex of the visiting animals. Upon learning such information, hunters can position themselves accordingly.

There are several well-established methods that a hunter can use to gather information about the presence and travel patterns of prey. One basic method is eye surveillance. By simply staking out and patiently waiting at a fixed position in the hunting area, a hunter might be presented an opportunity to observe prey that enters the area oblivious to the hunter's presence. However, while this may be the most effective technique for observing and actually hunting more elusive types of game animals, it may not be a very efficient technique to exercise either when the hunter has little known reason to expect that the desired prey will enter any particular area or when he is hunting a typically less vigilant species of game that can be effectively stalked. Therefore, information-gathering methods and devices that do not require the information gatherer to remain physically present at a location to be observed are often preferable to the human eye surveillance method.

Another basic, age-old method of obtaining hunting intelligence is to survey the land for animal tracks. Ground imbedded animal footprints, or "tracks," necessarily indicate that, at some time, an animal walked over the ground upon which they are found. A well-established trail of tracks may further indicate that animals of the species that left the tracks repeatedly travel along that path and are, therefore, likely to do so again. That logic is further supported if a trail contains tracks that are so well defined as to appear to be new or "fresh."

Often, hunters will prepare the ground to enable it to produce more visible tracks. This can be accomplished by, for example, raking the ground so as to expose moist soil that will be more revealing of later left foot, hoof or paw impressions than a more dried and hardened topsoil would have been. Nevertheless, despite even the best efforts to condition the ground for capturing foot impressions, weather conditions can severely limit the visibility and degrade the integrity of ground imprints. For example, if the ground is highly saturated from rainfall or melted snow, even recently made animal tracks may be indiscernible. That is especially true of the shallow tracks of lightweight animals, but even deeply embedded tracks that are otherwise highly discernable can become quickly eroded by precipitation. Furthermore, in areas where the ground surface is covered by grass, brush or foliage, many animals' tracks may not be detectable to the naked eye even in the best of weather conditions. Thus, for a variety of reasons, actively searching for tracks is not always a viable means for gathering hunting intelligence.

Another rudimentary method used by hunters to determine whether an animal has visited a location is to erect an obstruction for an animal to move or break. For example, a hunter might tie a taut fishing line between two vertical supports (e.g., trees, poles, etc.) and then vacate the area for a time. Upon his return, discovering a snapped line likely indicates to the hunter that an animal walked through the line during his absence. Tying so called "trip lines," even without integrated reaction devices of any sort, can be an inexpensive way for a hunter to simultaneously monitor many locations without having to remain physically present at any of them. However, there are a couple obvious drawbacks of resorting to such a tactic.

First of all, in order for an animal to reveal its presence to the returning hunter via this means, the animal must actually travel through the very supports between which the line is strung. Therefore, unless a line is strung so as to be substantially undetectable and unavoidable, there is a significant chance of an animal traveling through the general area without snapping the line, because of its conscious avoidance of the line or just simple happenstance. Secondly, the line could be snapped by a fellow hunter walking through the area or by an animal not of the type sought by the hunter. So, an inconspicuously placed trip line, if broken, could deceive the hunter into believing that his prey visited the area when, in fact, it did not.

Yet another method of gathering hunting intelligence is to mount a surveillance camera in the hunting area. While the hunter is away, the unattended camera can capture photographs of a prey animal that may enter the area. Of course, surveillance cameras, similarly, can be used to photograph unsuspecting humans that may have occasion enter a particular area for one reason or another. For instance, a landowner or property manager might wish to use an unattended camera to conduct surveillance over a land parcel for the purpose of collecting evidence that the land is being trespassed. However, it may be cost prohibitive to deploy multiple cameras in multiple areas and at multiple vantage points.

Thus, it can be appreciated that there exists a need for a new device for collecting foot, hoof or paw prints of an unsuspecting animal or person visiting an area of land, where such print collecting is useful for the purpose of providing, to a hunter or land proprietor, information regarding the presence, species, size and travel patterns of the animal or person. There is also a primary need for such a device to be camouflaged in an outdoor environment so that animals or persons will not consciously avoid stepping onto it and, thereby, avoid leaving their foot, hoof or paw impression thereupon. The inventor is not aware of any impression-recording device that is constructed and designed to allow its user to surreptitiously obtain foot impressions in an outdoor environment.

Secondarily, there exist needs for such a device to be: (1) affordable, so that a hunter or land proprietor, inexpensively, may deploy a multitude of such devices to several spots where they may be stepped upon; and (2) water resistant, so that the integrities of both an impression left upon the device and the device itself are protected from the effects of precipitation. The present invention substantially fulfills these needs.

SUMMARY

The present invention is directed to an apparatus for recording foot, hoof and paw (hereinafter, together generically referred to as "foot") impressions, the apparatus being colored and patterned to camouflage itself when outdoors resting on the ground and the apparatus including, at minimum, an impression component whereupon a viewable foot imprint may be made. The simplest version of the apparatus comprises only an impression member. A second version comprises an impression member affixed, at its bottom, to a foundation member. A third version comprises an impression member encased by a cover component. A fourth version of the apparatus comprises both an impression member and adjoined foundation member disposed within a cover. Furthermore, the various components of each of the aforementioned versions of the present invention may, themselves, have different embodiments and be fabricated from a variety of materials.

Nevertheless, it is an object of the present invention to provide a device that records an impression of the foot of an animal or person who steps onto the device. Some embodiments of the invention include an impression member adapted to produce a foot impression that is recessed into the impression member to a depth dictated by the magnitude of force applied to the impression member by a foot. Other embodiments include an impression member that is virtually flat, whereby a merely superficial impression is produced when a foot lands upon the impression member.

Another object of the invention is to provide a foot impression recording apparatus that is or can be camouflaged in an outdoor environment. Where a protective cover is included as a component of the apparatus, the cover's outer surface is colored so as to make the apparatus appear indistinguishable from the ground. Alternatively, the cover's outer surface may be coated with an adhesive substance so that the cover can by decorated with natural articles such as dirt, leaves or grass, or it can be adorned with synthetic camouflaging accessories. Where the apparatus does not include a cover, the top of the impression member itself is colored to camouflage the appearance of the apparatus. In any event, a hunter may wish to also camouflage the odors of the apparatus components, as well any scents left due to human handling of the apparatus, by applying to the device a commercially available scent removal spray.

Another object of the present invention is to provide an economical means for surreptitiously gathering intelligence about prey animals or unsuspecting humans. Since most embodiments of the present invention include only a few components, all of which are comprised of relatively inexpensive materials, the invention can be inexpensively manufactured, and it can be retailed for a affordable price. Consequently, the average end user may be able to obtain several articles of the invention in order to litter an area of land with them and increase his chances of recording footprints.

In some embodiments, it is yet another object of the present invention to be waterproof or, at minimum, water resistant. Where the invention includes a cover component, the cover is fabricated from a water resistant material so that, in addition to providing camouflage, the cover minimizes the effects that rain might otherwise have upon the impression member.

These and other objects of the present invention will become apparent upon review of the following detailed description and drawings.

DETAILED DESCRIPTION OF THE PREFERRED EMBODIMENTS

Figure 1:
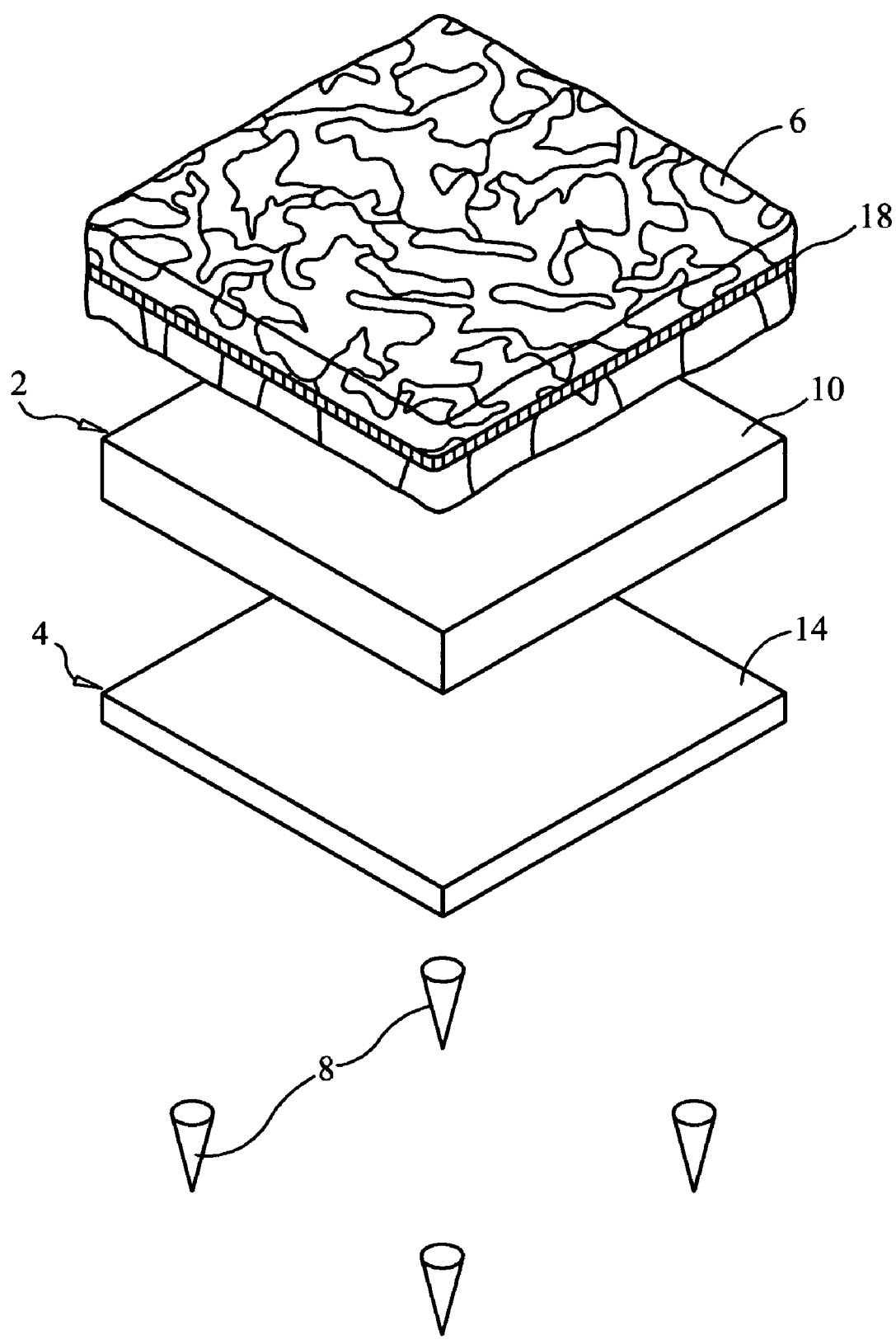
FIG. 1 is a top and front perspective view of the cover, impression member, foundation member and ground spikes of the preferred embodiment of the foot impression recording apparatus. In this view, none of the aforementioned apparatus components are shown assembled to any other of those components.

The foot impression recording apparatus of the present invention employs a host of combinations of components, as well as an assortment of embodiments of each component used. FIG. 1 illustrates the unassembled components of a preferred embodiment of the apparatus of the present invention. In this preferred embodiment, the components include an impression member 2, a foundation member 4, a cover 6 and a plurality of ground spikes 8.

Figure 2:
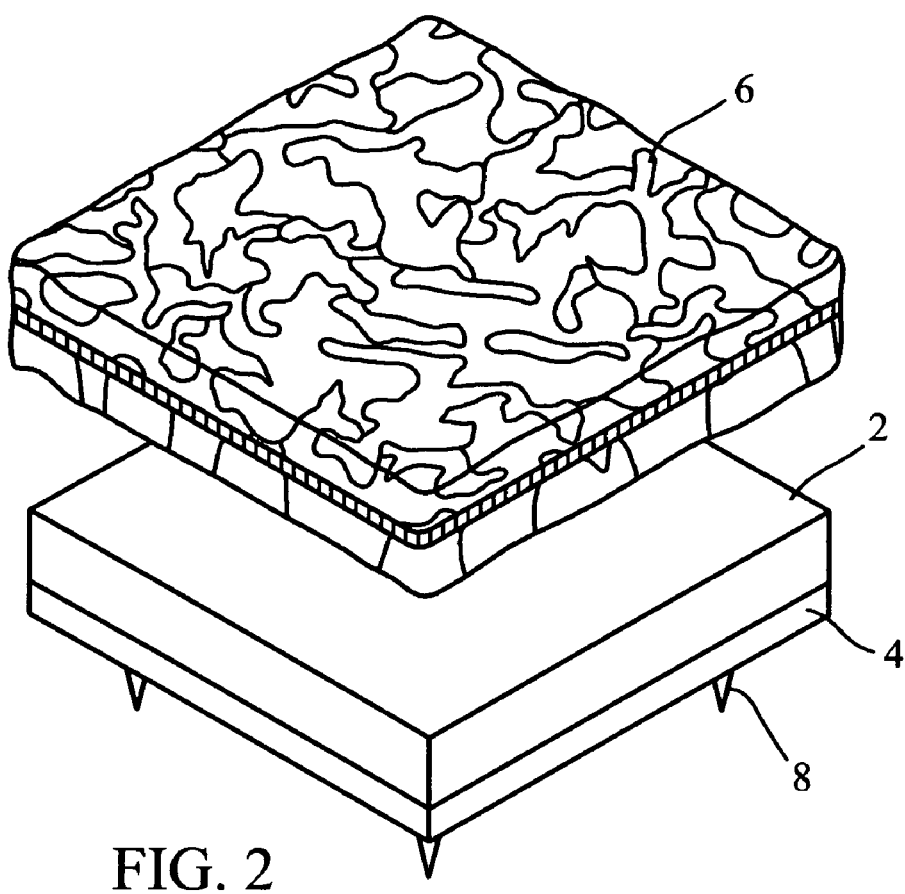
FIG. 2 is a top and front perspective view of the cover, impression member, foundation member and ground spikes of the preferred embodiment of the foot impression recording apparatus. In this view, the cover is displaced from the other aforementioned components.
Figure 3:
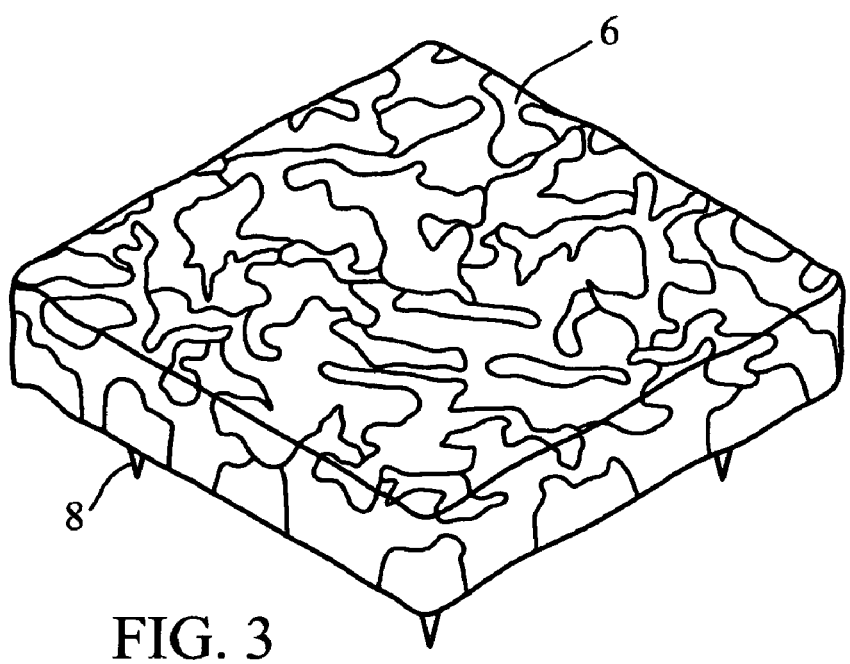
FIG. 3 is a top and rear perspective view of the preferred embodiment of the foot impression recording apparatus.
Figure 4:
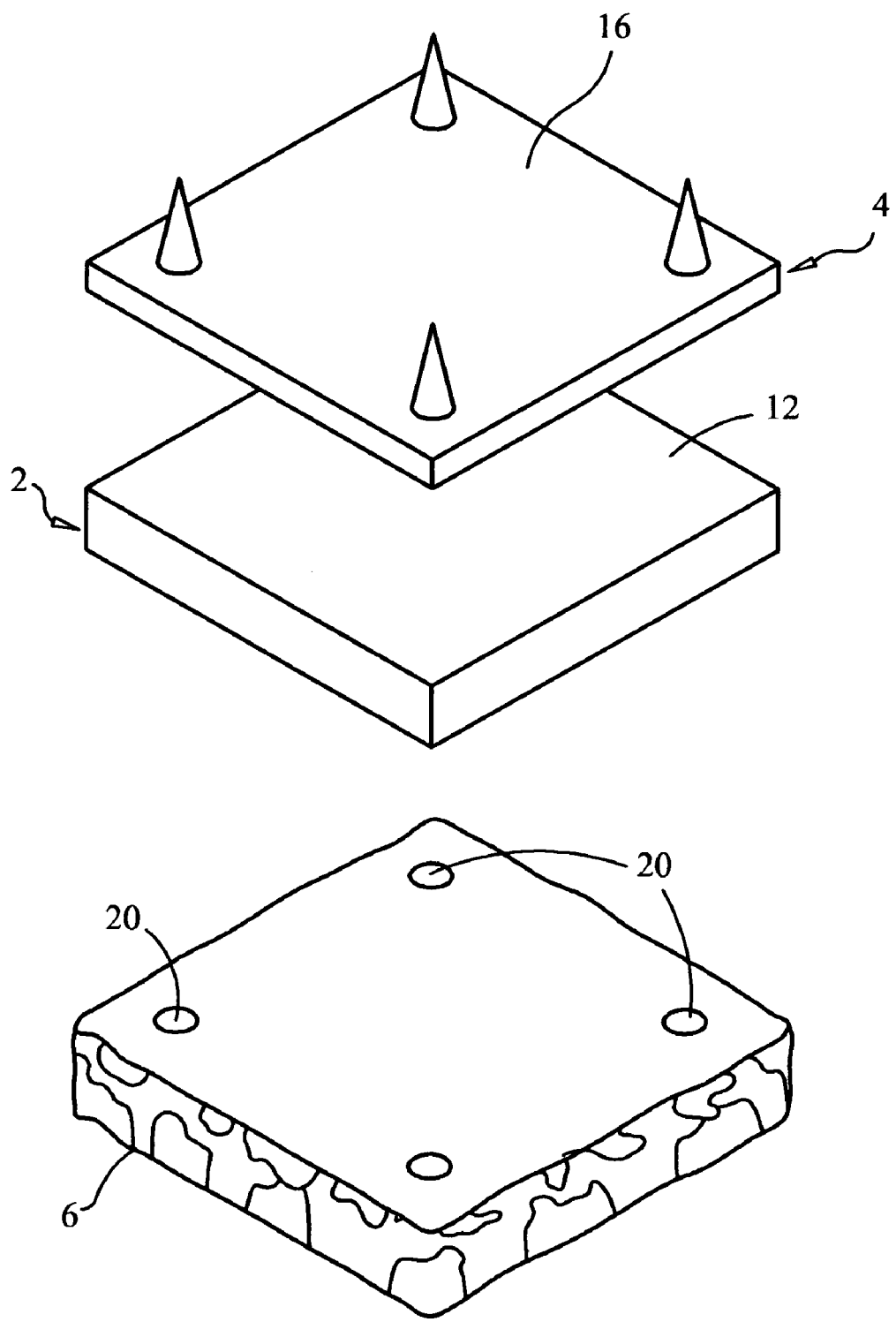
FIG. 4 is a bottom and rear perspective view of the cover, impression member, foundation member and ground spikes of the preferred embodiment of the foot impression recording apparatus. In this view, the aforementioned apparatus components are shown predominantly unassembled.

The impression member 2 is a slab of impact sensitive material capable of recording and holding a recessed impression of a foot landing onto the member 2 without rebounding and losing the impression once the foot is lifted from the impression member 2. Candidate impact sensitive materials include phenolic foam, clay and putty. In a preferred embodiment, as is depicted in FIGS. 1, 2 and 4, the impression member 2 has a thickness dimension of at least 0.25 inches. Such a depth of material allows a foot-shaped indentation to be created in impression member 2 by the weighted foot of a human or game animal stepping onto the apparatus. Alternatively, in another embodiment, the impression member 2 comprises a substantially flat (less than 0.25 inch thickness) sheet(s) of material for recording a one-dimensional foot impression. For examples, the impression member 2 could be comprised of microencapsulated paper or, alternatively, ordinary paper layered with either carbon paper or transfer paper.

As can be gleaned from juxtaposing FIGS. 1, 2 and 4, the bottom 12 of the impression member 2 is attached to the top 14 of the foundation member 4. A permanent adhesive substance secures this attachment (not shown). The foundation member 4 is a planar figure constructed of any of a variety of rigid materials such as wood, plastic, hard rubber or dense cardboard. The purpose of the foundation member 4 is to support the impression member 2 during the moment that a foot is in contact with the apparatus. More specifically, when a foot lands upon the apparatus, the foot applies a downward force to the top 10 of the impression member 2. That downward force is then transferred through the impression member 2 and projected upon the foundation member 4. Because of the rigidity of the foundation member 4, a supportive upward force is counteractively projected upon the impression member 2. This upward force is coupled with a similar responsive force applied by the ground against the foundation member 4 to create an aggregate upward force equivalent to the downward force applied by the landed foot. The result is a physical compression of the impression member 2 along the surface area of the bottom of the landed foot causing an imprint of that foot to be recorded on the top 10 of the impression member 2.

In the preferred embodiment, a plurality of a sharpened ground spikes 8 are attached to and extend downward from the bottom 16 of the foundation member 4. The spikes 8 may be secured to the bottom 16 of the foundation member 4 by any of a plethora of fastening means such as a permanent adhesive substance, welding or screws (none shown). Alternatively, the spikes 8 may be simply appendages of the same object mold as the foundation member 4. In any case, proper ground placement of the preferred embodiment of the present invention demands that the user press the apparatus onto the ground such that the spikes 8 are sunk into the soil, giving the apparatus horizontal stability on the ground.

In the preferred embodiment, the adjoined impression member 2 and foundation member 4 are disposed within a removable cover 6 that is fabricated from a waterproof or water resistant material such as plastic, vinyl, waxed paper or a tightly woven nylon/polyester blend. The outside surface of the cover 6 is patterned in colors so as to camouflage the apparatus in an outdoors environment. Thus, the cover 6 has a dual purpose of preventing rainwater from distorting the impression material and making the apparatus substantially unnoticeable to game animals when on the ground in a hunting area. In fact, for greater camouflaging, the cover 6 may be coated with an adhesive substance (not shown) allowing dirt, grass, leaves and the like to be applied to the cover 6.

As shown in FIG. 1, an embodiment of the cover 6 includes a zipper track 18 that runs along multiple ends of the cover 6. A zipper may be slid along this track 18 to open and close the cover 6. When the cover 6 is in an open configuration, a user may remove the adjoined impression member 2 and foundation member 4 from the cover 6 in order to inspect the impression member 2 for the existence of a recorded foot imprint. Although the particular impressionable material used as the impression member 2 may dictate that an impression member 2 not be reused once a foot imprint is produced upon it, the cover 6 can be reused in combination with new impression and foundation components.

The dimensions and geometric configuration of the apparatus of the present invention can greatly vary. Depending upon the terrain of the hunting area, a broader or smaller apparatus may be desirable. Nevertheless, as illustrated in FIG. 2, in the preferred embodiment, the configuration of the cover 6 mirrors that of the combined object that is the adjoined impression member 2 and foundation member 4, whereas each cover dimension must be slightly greater than its counterpart dimension of the combined object so that the cover 6 will snugly fit around both the impression member 2 and the foundation member 4 when the cover 6 is in a closed configuration. Also, as shown in FIG. 4, in the preferred embodiment, the bottom of the cover 6 includes a plurality of holes 20 through which the plurality of spikes 8 may protrude.

An alternative embodiment of the present invention is comprised of an impression member 2 disposed within a removable cover 6, and does not include a foundation component. In this embodiment, the impression member 6 comprises an impact sensitive material slab of sufficient thickness that the impression member 6 can record a foot imprint using only the ground to provide any needed support.

Another embodiment of the apparatus comprises an impression member 2 backed by a foundation member 4 and does not include a cover component. In this embodiment, the top 10 of the impression member itself (as well as any sides of the impression member 2 and the foundation member 4 which are viewable while the apparatus is resting on the ground) is colored to camouflage the apparatus in the outdoors. A coverless embodiment of the apparatus may be desirable because it is more impact sensitive by virtue of not presenting any barrier between the impression member 2 and a foot and, thus, may tend to record an impression that more accurately depicts the foot. This is especially true with respect to recording the foot impressions of lightweight animals.

Finally, yet another embodiment of the foot recording apparatus of the present invention comprises merely a camouflaged impression member 2, without any cover or foundation. The viewable sides of the impression member 2 are camouflaged in this embodiment as well.

The preceding descriptions of embodiments of the present invention are merely illustrative of the best modes contemplated by the inventor and do not necessarily constitute all conceivable embodiments fitting within the scope of the present invention.

I claim:

1. An apparatus for recording foot, hoof and paw impressions, the apparatus comprising:
    a foundation member;
    an impression member comprised of impact sensitive material, wherein the impression member is disposed atop the foundation member, and wherein the top of the impression member comprises a pattern of colors replicating a common appearance of a ground surface so that the apparatus may be substantially camouflaged while resting upon a ground surface; and
    a cover comprised of thin, water resistant material, wherein the impression member and foundation member are removable disposed within the cover; and
    a plurality of ground spikes protruding downward from said foundation member, the spikes for holding said apparatus in rigid position on the ground.

2. The apparatus of claim 1, wherein said cover has an outer surface comprising a pattern of colors replicating a common appearance of a ground surface so that said apparatus may be substantially camouflaged when resting upon a ground surface.

3. An apparatus for recording foot, hoof and paw impressions, the apparatus comprising:
    an impression member comprised of impact sensitive material;
    a foundation member disposed underneath the impression member; and
    a cover comprised of thin, water resistant material, wherein the impression member and foundation member are removably disposed within the cover.

4. The apparatus of claim 3, wherein said impression member is substantially flat and produces a visible impression upon being stepped on by an animal or human.

5. The apparatus of claim 3, wherein said impression member has a thickness of at least 0.25 inches and produces a recessed impression upon being stepped on by an animal or human.

6. The apparatus of claim 3, wherein said cover has an outer surface comprising a pattern of colors replicating a common appearance of a ground surface so that said apparatus may be substantially camouflaged when resting upon a ground surface.

7. The apparatus of claim 3, further comprising a plurality of ground spikes protruding downward from said foundation member and through said cover, the spikes for holding said apparatus in rigid position on the ground.

* * * * *